United States Patent [19]

Pargee, Jr.

[11] 4,422,093
[45] Dec. 20, 1983

[54] TELEVISION BURST SERVICE

[75] Inventor: Robert W. Pargee, Jr., San Clemente, Calif.

[73] Assignee: Eeco Incorporated, Santa Ana, Calif.

[21] Appl. No.: 461,316

[22] Filed: Jan. 27, 1983

Related U.S. Application Data

[63] Continuation of Ser. No. 249,792, Apr. 1, 1981, abandoned.

[51] Int. Cl.³ .............................................. H04N 9/32
[52] U.S. Cl. ...................................... 358/12; 358/142
[58] Field of Search ...................... 358/12, 85, 86, 102, 358/142, 143, 145, 146; 360/35

[56] References Cited

U.S. PATENT DOCUMENTS

| | | | |
|---|---|---|---|
| 3,729,581 | 4/1973 | Anderson | 358/102 |
| 3,745,240 | 7/1973 | Morchand et al. | 358/146 |
| 3,746,780 | 7/1973 | Stetten et al. | 358/142 |
| 3,891,792 | 6/1975 | Kimuro | 358/142 |
| 4,028,733 | 6/1977 | Ulicki | 358/86 |
| 4,032,972 | 6/1977 | Saylor | 358/86 |
| 4,161,728 | 7/1979 | Insam | 358/85 |
| 4,161,753 | 7/1979 | Bailey et al. | 358/128 |
| 4,165,521 | 8/1979 | Watanabe | 360/10 |
| 4,236,185 | 11/1980 | Obremski | 360/10 |

FOREIGN PATENT DOCUMENTS

| | | |
|---|---|---|
| 2421108 | 7/1976 | Fed. Rep. of Germany . |
| 1341763 | 12/1973 | United Kingdom . |

OTHER PUBLICATIONS

"Still-Picture Television", NHK Technical Research Laboratories, Jun. 1979.
Connolly et al., "The Electronic Still Store-A Digital System for the Storage and Display of Still Pictures", International Broadcasting Convention, London, England, Sep. 20-24, 1976, pp. 76-83.
Kiugr, Color Television Fundamentals, 2nd Edition, McGraw-Hill, N.Y., 1964, p. 36.

Primary Examiner—Richard Murray
Attorney, Agent, or Firm—Harry R. Lubcke

[57] ABSTRACT

A visual service that employs the full facilities of a television communication channel on an intermittent basis. A user chooses certain still picture television frames that contain subject matter of interest to him, and conveys these choices to a central transmitting facility. These are then contiguously assembled for transmission to the user, perhaps with frames of other users as well, in a "burst" of such video frames.

These frames are stored at the user's location, and can be brought up for viewing as often as desired. A vertical interval code may be used in the system for frame identification and to reproduce only what the user has chosen.

8 Claims, 7 Drawing Figures

TELEVISION BURST SERVICE

This application is a continuation, of application Ser. No. 249,792, filed Apr. 1, 1981, now abandoned.

BACKGROUND OF THE INVENTION

This invention pertains to a visual service that employs the full facilities of a television communication channel on an intermittent basis.

The art has provided an auxiliary service in an essentially continuous process that supplies auxiliary information during only a small fraction of the duration of each frame of television subject matter. This typically occurs within the vertical scanning retrace interval.

This service can only occupy a limited area of the television picture, such as a line of printing in the nature of a sub-title.

The art has also provided a single television image frame, or a successive series of frames to provide a pictorial replay from an originating source.

An example is the known stop-motion frame of a football telecast to determine whether or not a touchdown has been made.

A variation of the above is the replay of a hundred to several hundred frames to show an action in the game that is of interest.

These activities occur at the transmitting station under the control of the program director. A choice by an individual viewer as to what he will see is not possible.

SUMMARY OF THE INVENTION

This invention provides a service for individually transmitting and receiving one or more frames of video signal at television speed. During such transmission the full video bandwidth and all other facilities of the video and the synchronizing channel are employed. These frames may be periodically successively transmitted in a "burst". This may be during a brief break in a main television program service, being otherwise continuous. Alternately, a channel may be dedicated to "burst" transmissions.

The pictorial subject matter of the "burst" frames is usually not related, one to the other, or to a television service. Frames may be rendered in color if the television system is capable of color. Cable TV facilities may also be used.

A user (viewer) at his receiver chooses which frame or frames are to be selected (i.e., specified) for his viewing. This selection is communicated to a central transmitting station, where the desired subject matter is on file, or is produced for the request.

In general, there are a number of viewers making selections at any time. These selections are preferably collated into a unified "burst" sequence, which is transmitted upon an empirically scheduled basis for an interval of perhaps from a fraction of a minute to a few minutes.

The "burst" may be transmitted on any communication channel having video bandwidth, and in any relation to any other video material, as in a multi-use cable or satellite system.

The video burst sequence is stored at the receiver of each user utilizing the service. Any one viewer may then reproduce all of the selections until he reproduces the one he specified, being added by an initially reproduced "table of contents". Alternately, coding may be employed with automatic code selection means to reproduce only the selection specified by a user at his receiver.

The received material is stored for viewing at any time.

DETAILED DESCRIPTION OF THE PREFERRED EMBODIMENTS

Figure 1:
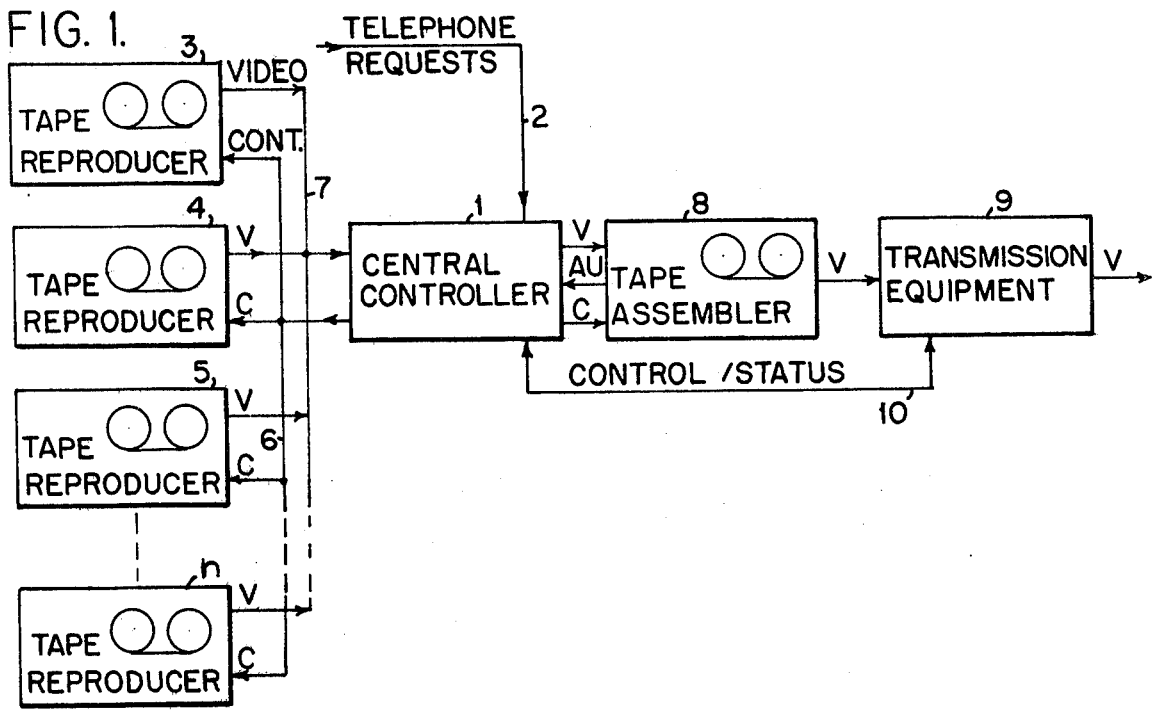
FIG. 1 is a block diagram of the Central Equipment, at the transmitting location.
Figure 2:
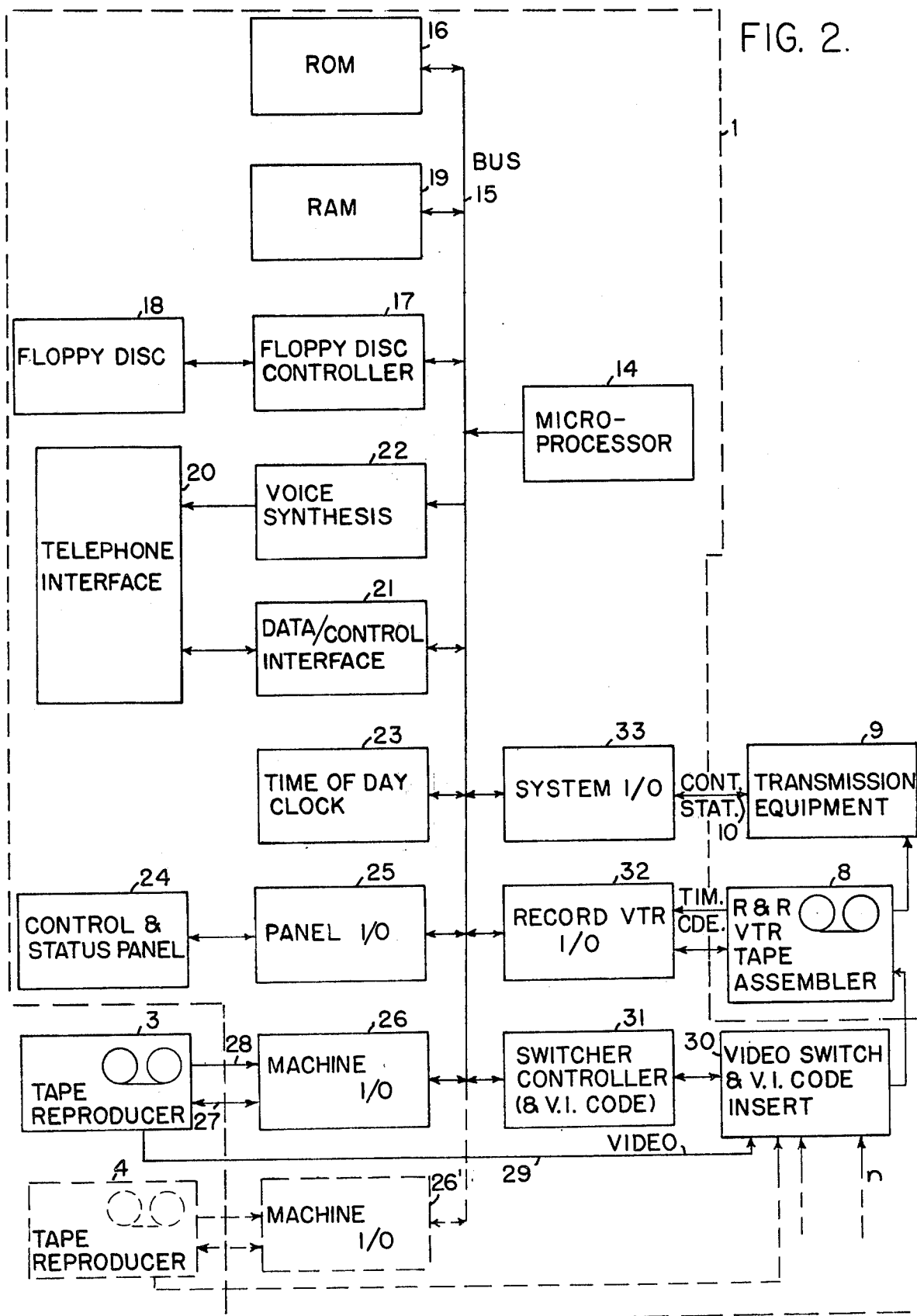
FIG. 2 is a block diagram of the Central Controller, a part of the Central Equipment.

In FIG. 1, numeral 1 identifies the Central Controller, a device that is detailed in FIG. 2. As the name implies, it controls the several other devices at the originating, or transmitting, station.

A request for specified frame(s) service originates from a user, and is electrically transmitted to the Central Controller. This may be via an incoming channel 2, such as a telephone line. The usual telephone instrument of the touch-tone type may be used by the user.

Typically, a request is accompanied by the user's identifying number. This number is used to identify the request as it is electronically handled, and also to provide a measure of security to prevent unauthorized use.

In a simple form, the request also includes a few digit number, which uniquely determines the specific pictorial subject matter to be presented; i.e., a picture of the volcanic Mt. St. Helens erupting. Such number is typically made available to the user by a printed catalog of availabilities, or video transmissions over the system when a more general number pertaining to the desired subject matter is introduced by the user. That is, from the general category the specific category and then the specific selection is made known.

The user makes a request for one or more specified complete images.

The desired information in video form, is contained in usually more than one video signal reproducer at the transmitting station. These may be plural video tape reproducers 3, 4, 5, . . . n, all connected to the Central Controller by one set of conductors 6, for the control of the reproducers by the Central Controller, and by another set of conductors 7, for conveying the video output selectively from the reproducers to the Central Controller for ultimate transmission to the user.

Each reproducer is separately actuated by an appropriate code number, known to contain the frame sought, and then further actuated to reel the reproducer to the specific frame sought, which is then accepted as a video signal by the Central Controller for subsequent disposition.

In typical operation, successive requests are received by the Central Controller, and one or more reproducers are successively actuated to bring forth the picture material requested.

The video signals corresponding to each requested single frame are immediately passed-on to tape assembler 8. These frames are sequentially and contiguously recorded on the tape to provide the subject matter of a subsequent "burst" of individual frames to satisfy one or more requests. The tape assembler is a video recorder-reproducer. Control thereof to position one frame of video directly adjacent to another; i.e., "on"—"off", is provided from Central Controller 1, via an appropriate control conductor. Means 1–8 form a video signal of one, or more, frames representing the specified image.

A second "audio" channel on the tape entity 8 is connected to Central Controller 1. This provides time code control for indexing the associated video material.

Transmission equipment 9 accepts the "burst" video signal, now composed to reflect the user selections that have been made, and passes this on via a transmission channel.

The transmission equipment represents a wide band communication channel. This may be the known television transmitter used in television broadcasting, cable television, satellite broadcast, or beam radio wave relay, such as handles the video signal of the specified image desired by the user at video speed. "Wide band" may be subject to considerable variation, but the usually understood frequency band from a few hertz to 4.5 megahertz is the norm, with a wider or narrower band by a factor of 50% being acceptable. This invention functions properly in any event. The width of the band determines how detailed the images are.

In FIG. 1, the control/status line 10 connects the Central Controller to the transmission equipment, particularly for the purpose of conditioning the transmission equipment to receive the "burst" when the appropriate time for the transmission occurs.

FIG. 2 gives the detail of Central Controller 1. This is included within the dotted line. Certain of the other entities of FIG. 1 have also been shown for completeness.

Microprocessor 14 provides general control, according to a software program that has been prepared for it, and which is shown in the form of flow charts in FIG. 5. Typically, the microprocessor is an IC (integrated circuit) general purpose computer, such as the Intel 8085.

Bus 15 connects the microprocessor to and from the several other entities within the dotted area in the circuit of FIG. 2. The bus typically comprises 8 data lines, 16 lines for address, and a few more lines for control; i.e., read, write and timing.

Read only memory 16 (ROM), which may be an Intel 2716, performs bootstrap service to microprocessor 14, to empower it to access a set of commands to floppy disc controller 17. That entity then accesses the program located on the recorded program means, floppy disk 18; being typically a magnetic recording medium.

That program is then stored in random access memory (RAM) 19 by the control exercised by microprocessor 14. RAM 19 may be a semiconductor memory which has rewrite capability and random access; it may be the Mostek MK 4116, which, with an array of 8×2 provides 32,768 bytes.

It is now possible to begin to execute the program, which not only contains the operational program for microprocessor 14, but also cross-reference information between catalog selection numbers and reel and frame numbers associated with them; also cross-reference information between reel number and playback machine numbers. All of this information is brought in from floppy disc 18 and put into RAM memory 19.

Means are provided to communicate with the user; i.e., telephone interface 20. The lower part thereof has facility for handling data and control, such as ring detector circuitry, "hook switch" relay, line terminator transformer, and touch-tone detector circuitry.

The data include "ringing occurring," or ringing "not occurring," telephone "off hook," or not, etc., whether or not numbers are being received by touch-tone, and if so, what are the numbers. Other functions are "go off hook", answer a ringing signal, and go back "on hook" at the end of the conversation with a user.

The above information comes and goes through data/control interface 21. This is comprised of conventional medium scale integration (MSI) digital circuits, organized in the conventional microprocessor manner, for address decoding, device selection, tri-state gating to insert selected data on bus 15, and flip-flops to store selected data from the bus. These elements may be the Texas Instruments, Inc. 74 LS 240, 74LS30, 74LS138, and 74LS 259.

The tri-state gates have three states; a normal binary "hi" and binary "lo", and a completely open-circuited state. This allows a large number of these gates to be connected to bus 15.

When a gate is in the open-circuit state it does not load the bus and so does not interfere with any other action upon the bus. When a gate is in the active state it does impress on the bus either a hi or a lo condition. The circuit structure is similar to the old telephone party line. Each tri-state gate has an enable function pin connection. An address decoder decodes the particular address for that tri-state gate. Whenever that address occurs only that tri-state gate is put in the active state and then communicates to the bus the condition that is associated with that gate input.

Voice synthesis device 22 is an example of part of the means to communicate with the user. It accepts data from microprocessor 14 concerning voice messages to be sent back to the user of the service and converts these data to voice sounds that are sent to the user. Typical voice sounds answer a call from a user, giving prompting assistance in making selections, correcting the user when errors are made, informing the user when his selection(s) will be transmitted to him, and the page number(s) of his selection, concluding the telephone call, and arranging for hanging up the telephone at the end of the message. This device may be a Texas Instruments, Inc. TMS5200 voice synthesis processor.

Further in FIG. 2, time of day clock 23 provides real time information that is utilized in formulating when a "burst" transmission can occur. It may be a single digital functioning chip, plus a few MSI device select chips. These are available from the National Semiconductor corporation. This clock is connected to bus 15. Typically, a piezo crystal, as one operating at 32 kilohertz, is connected to the clock to give a time standard for its operation.

Control and status panel 24 enables initial setup to be accomplished by an operator, also subsequent monitoring, and subsequent changes, if required. Entity 24 connects to bus 15 through Input/Output panel 25. This provides an addressable port interface function connection to the bus. This interface is similar to the above described telephone data/control interface 21. The circuits are similar but the address code is different.

At the lower left in FIG. 2 plural sources of specified images are the plurality of video playbacks shown at 3, 4, 5, ... n in FIG. 1. Machine I/O input-output entities are shown in each case to connect the video playbacks to bus 15.

In FIG. 2 playback video tape recorder (VTR) 3 is shown, along with machine input/output (I/O) entity 26, as exemplary of the plural sources and companion I/O entities that are more fully shown in FIG. 1.

A known time code output is conveyed from VTR 3 to I/O 26 via connection 27 for providing address information to microprocessor 14. Machine I/O 26 is similar to previously described interface 21, except that it additionally has known time code reader circuits and provision for transferring data from these circuits to bus 15 when selected.

A further output of VTR 3 is conveyed by conductor 29 to video switch and VI code insert entity 30, on its way to ultimate transmission. Entity 30 has known VI code insertion circuits and known video routing switch circuits.

Entity 31 is similar to interface 21.

Both of these additional circuits accept data provided by microprocessor 14 via bus 15 when the addresses for this interface are present.

Playback VTR entity 4 and its machine I/O are shown dotted in FIG. 2. This entity and the others follow the circuits for VTR 3 and provide outputs to switch entity 30. In entity 30 the proper video signal from amongst the several playback VTRs is outputted under the control of microprocessor 14 through switcher controller and VI code data interface entity 31.

In this way the unique code that has been provided by the microprocessor is inserted in the vertical (synchronizing) interval, VI, upon what horizontal scanning lines are selected for the system for such information, and individually for each of the (plural) frames chosen.

This selected video signal then enters record and reproducer VTR 8. See FIG. 2. Also connected to entity 8 is record VTR I/O 32, which is further connected to bus 15. This input/output entity is similar to I/O entity 26, except that it has a different address and digital control of the record function.

Record and reproducer VTR (tape assembler) 8 has prerecorded time code information and through I/O entity 32, control from microprocessor 14 causes VTR 8 to position its video tape so that the typically several unrelated frames are placed contiguously adjacent to each other.

When a "burst" of typically plural frames is to be transmitted, after having been assembled in entity 8, the video signals are reproduced from the video tape thereof and enter video transmission system 9. This preferably occurs on an empirically scheduled basis. That is, this may be every half-hour, or more or less frequently, depending upon the demands of the users, or for other reasons of convenience.

System I/O 33 is connected to bus 15 and entity 9, the latter by control and status conductor 10. The ultimate signal authorizing transmission of the "burst" comes from microprocessor 14 through system I/O 33.

Transmission equipment 9 has been described in connection with FIG. 1. System I/O 33 is connected thereto by conductor 10 and to bus 15 for control. This entity is similar to entity 21, except for having a different address.

Figure 3:
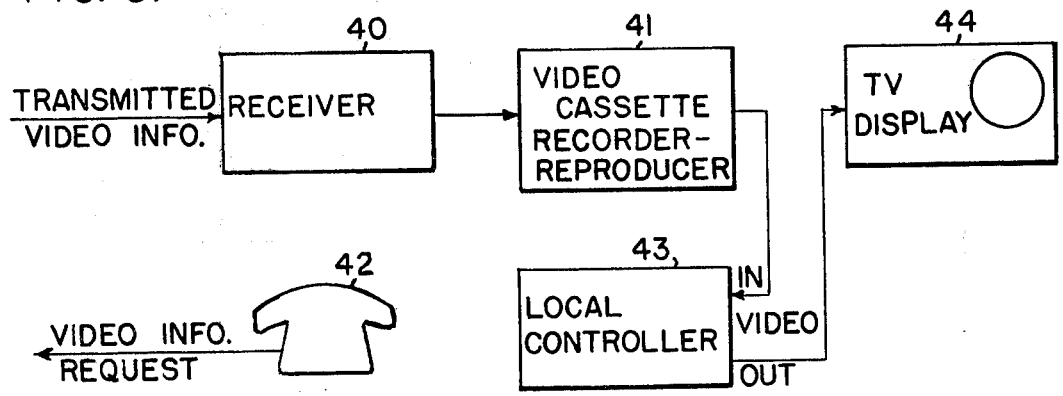
FIG. 3 is a block diagram of the User Equipment, at the receiver location.

FIG. 3 is the block diagram for user's equipment, such as is located in a home, office or store.

Receiver 40 intercepts the incoming transmitted signal. Depending upon the nature of the communication channel, this item may be a television receiver if the signal is broadcast by a television transmitter, terminal amplifying equipment if by a video cable, a satellite receiver if satellite broadcast, or a beam relay receiver if beam relayed.

Video cassette recorder-reproducer 41 represents means for storing one, or a few, frames of video signal after the transmission thereof. This is preferably a high quality device, of which Panasonic, RCA and Sony are presently examples.

In the typical situation, receiver 40 is connected to video cassette recorder-reproducer 41, for recording the whole "burst" of incoming frames.

The use of the system is inaugurated by referring to a catalog of available information. In a matured system the scope of available information is very large. The catalog is made available as a printed publication, or it can be presented over the system by a user utilizing a simple index number, such as 001. Similar index numbers may be provided for a number of general subjects, so that the user is not overwhelmed with availabilities.

Telephone 42 in FIG. 3 is the usual touch-tone type as provided by the local telephone company and is connected normally to the telephone line. This provides the means for the user to make his request known to the central equipment of the system. The usual phone call to that facility is made. After invitation by the voice synthesis entity 22 at the central location, the user touch-tone dials the selection of frames he wishes to view. Central Controller 1 determines when the burst transmission containing his selections will be transmitted, and what page numbers therein will be his selections.

The Central Controller handles all requests and has information on how many requests may be ahead of any particular user. That entity is programmed to estimate how long a time interval is to be expected before the particular user's request will be assembled on tape assembler 8 of FIG. 1.

Assuming a burst transmission at every half hour, if the next burst transmission is due in 10 minutes and the particular user's selections can be assembled in 7 minutes, voice synthesis 22 will be directed to inform the user that his burst transmission will occur in 10 minutes. Conversely, if the que of other requests and the time required to fill the user's request requires 12 minutes or longer, then the voice replay will be to the effect that the desired burst will occur in 40 minutes.

Upon being informed, the user enters the time of the burst and the pages of his selection in his Local Controller, 43.

Alternately, it can be arranged so that by the user pressing one button the time of burst and pages of the selection can be electronically fed into the Local Controller directly from the telephone line. The voice replay may be eliminated, or supplemented by a simple code that is directly acceptable to the Local Controller.

After the "burst" is received it is stored on video tape in cassette entity 41. At any time thereafter the user can view his selection(s) by simply activating Local Controller 43. This turns cassette entity 41 "on" in the reproducing mode, for repeatedly reproducing the one frame at video speed. It appears on TV display 44, which is a television picture tube with associated scanning circuits.

The reproduced video signal exits cassette entity 41 and enters the Local Controller to extract VI code information necessary to locate the page(s) specified by the user. Optionally, the TV screen may be blanked out for all other pages that may be in the burst. Further, optionally, the page number may be inserted in one corner of the video picture by energizing known means that can be made a part of the Local Controller. Such an insert is desirable if the user prefers to examine all of the pages in the burst.

The Local Controller either automatically or manually places cassette entity in the still frame mode to allow continuous viewing of a selected frame, or any frame by a manual over-ride.

Figure 4:
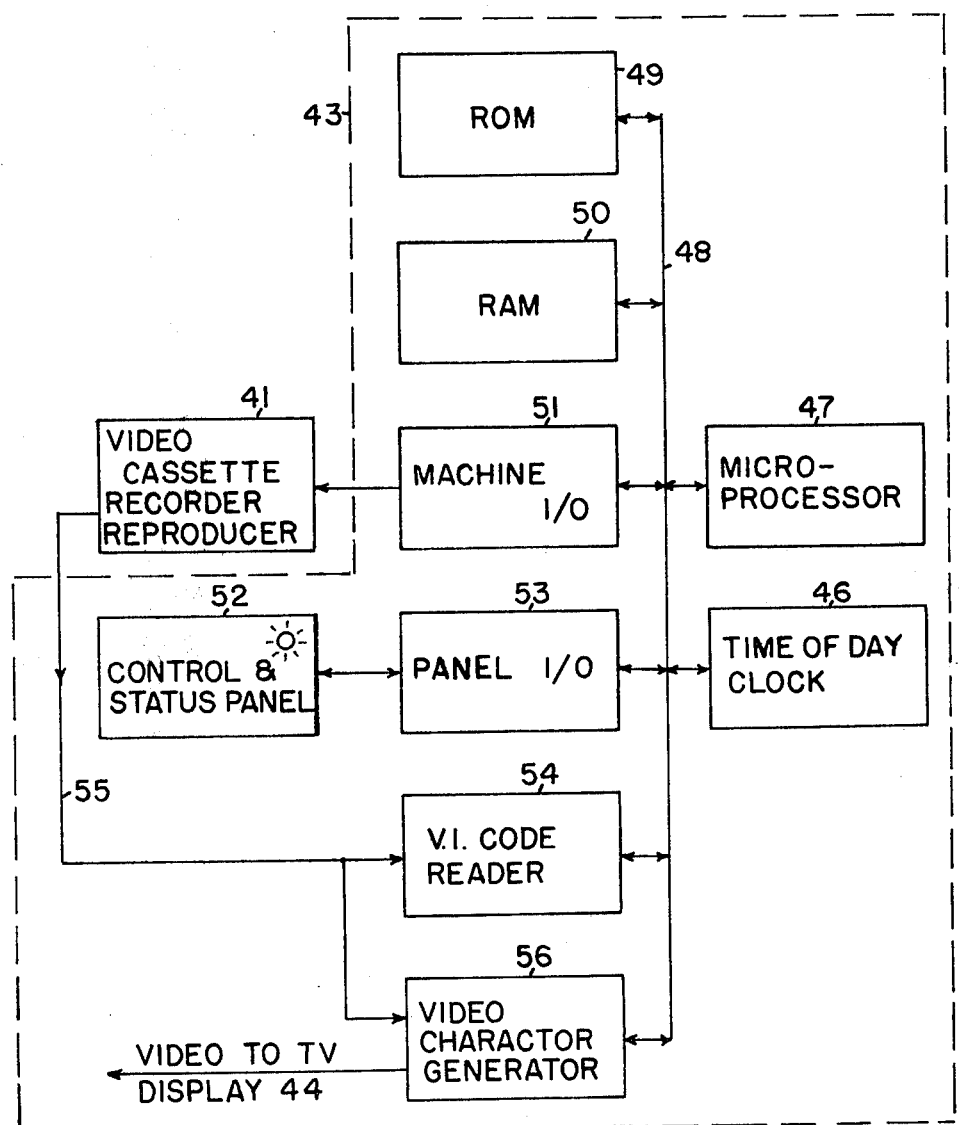
FIG. 4 is a block diagram of the Local Controller, a part of the User Equipment.

FIG. 4 is a block diagram of the Local Controller part of the user's apparatus. The main function of the Local Controller is to locate a specific page of selected video information in the locally recorded "burst" transmission. The structure follows that of Central Controller 1 of FIG. 2, but is simpler because there are fewer and less changeable duties to perform.

Microprocessor 47, bus 48, ROM 49 and RAM 50 are similar to these entities in Central Controller 1.

Because of the simpler functioning, the entire control program is fixed and is stored within ROM memory 49. The RAM memory 50 may accordingly be smaller than before.

Microprocessor 47 may be an Intel 8085, ROM 49 an Intel 2716, and RAM 50 two Intel 2142.

Machine I/O 51 serves the same function as did entity 26 before. Entity 51 controls video cassette recorder-reproducer 41 for video reproduction purposes at the user's location.

A relatively simple control/status panel 52 allows the user to perform basic functions, such as equipment "on", "off", making selections, and initiating control functions.

Panel I/O 53 connects control/status panel to bus 48. This I/O panel accomplishes the same function as prior panel I/O entity 25.

VI code reader 54 is supplied with the reproduced video signal from VCR record-reproduce entity 41 via conductor 55. Reader 54 interprets the vertical interval code from the one or more scanning lines that occur during the vertical blanking interval of the video signal.

The known Society of Motion Picture and Television Engineers code (SMPTE code) is suitable. It utilizes only one line.

Reader 54 is also connected to bus 48. This structure allows the microprocessor 47 to extract the VI code data necessary for its program to locate the desired page.

Time of day clock 46 feeds bus 48.

Video character generator 56 also accepts the reproduced video signal from conductor 55. The page number from vertical interval information is formulated into a subsidiary video that is impressed upon TV display 44 of FIG. 3. This formulation is accomplished by conventional means utilizing integrated circuits that are the same or are similar to National Semiconductor part No. MM5840. This provides a human readable page number to be inserted in one corner of the television image.

Figure 5B:
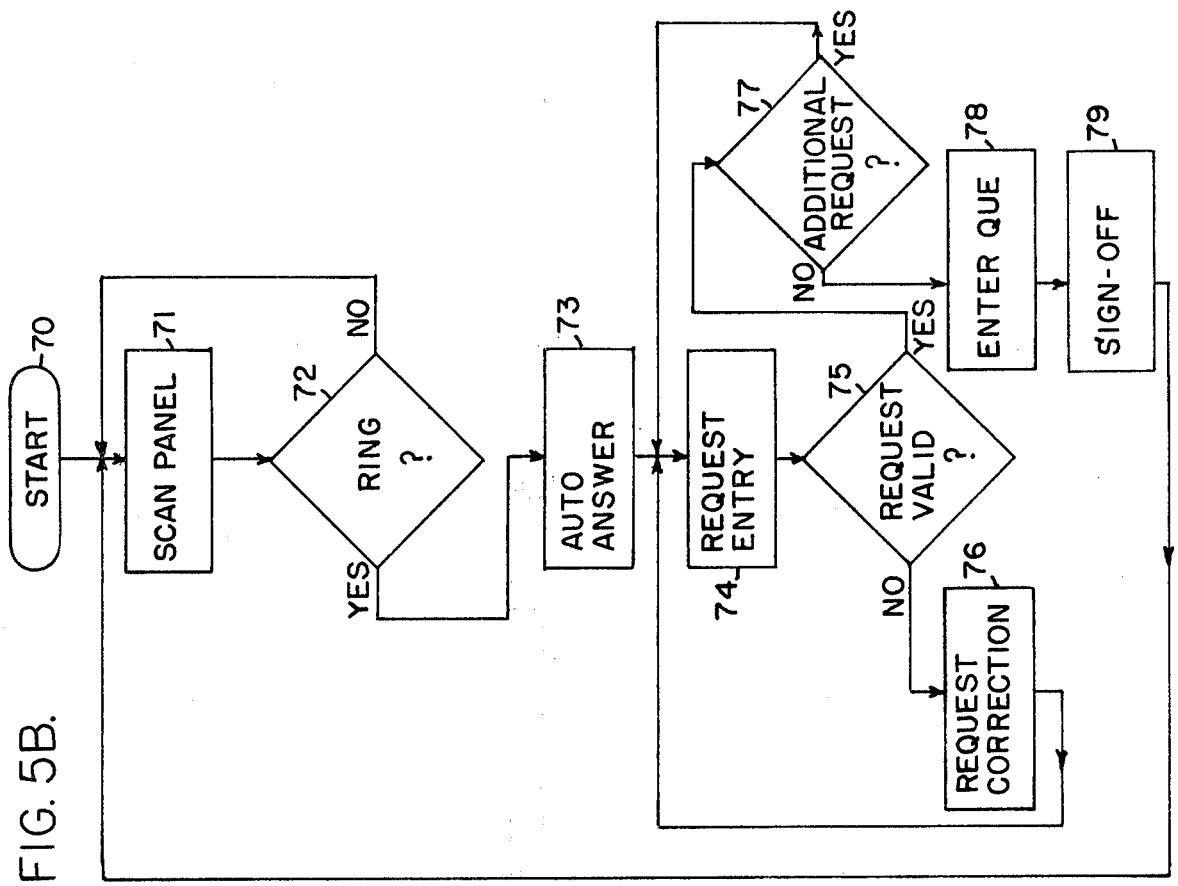
FIG. 5B is the same; for the background program.
Figure 5A:
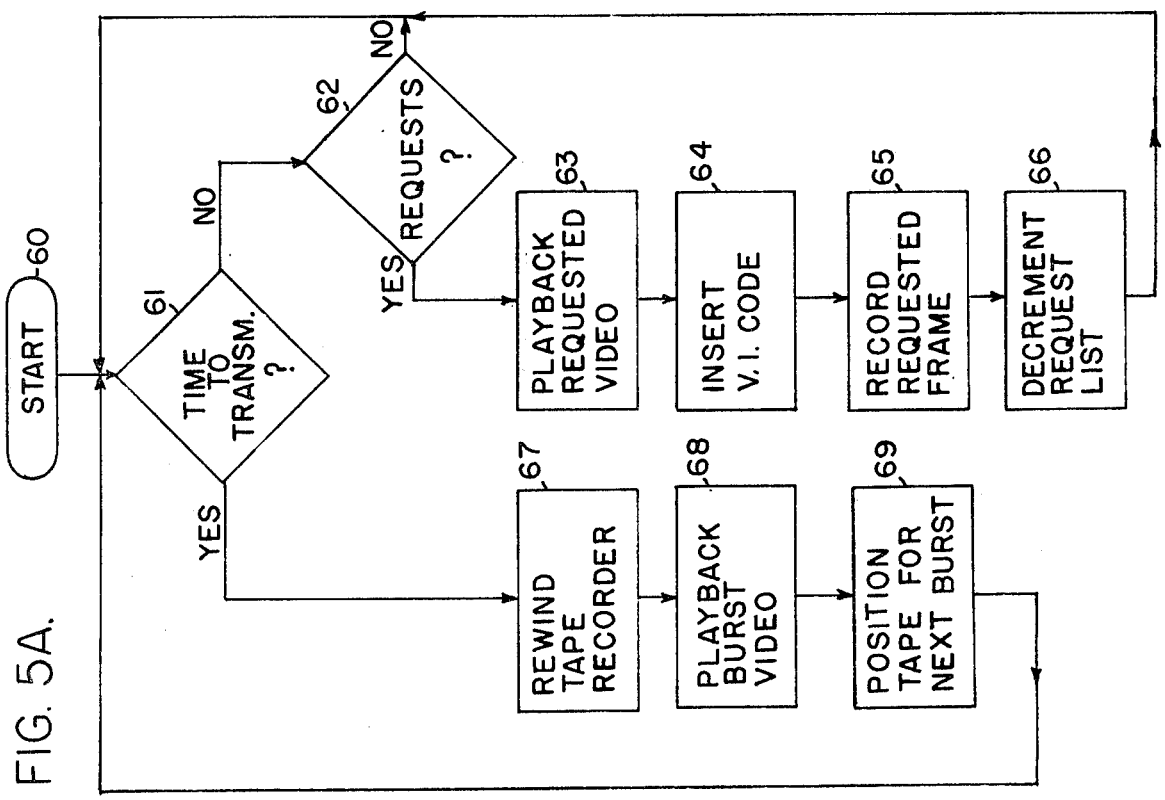
FIG. 5A is a flow chart for the microprocessor of the Central Controller; the foreground program.

FIG. 5A is a flow chart for microprocessor 14 of Central Controller 1; the foreground program. FIG. 5B is the same for the background program.

Microprocessor 14 is arranged for "multitasking"; i.e., a program that simultaneously executes two functions. Typically, this is performed by an interrupt routine that shifts between partially processing one program, then shifts to the other program and processes a portion of it, and then back to the previous program to process a further portion of it, and so on.

The foreground program usually performs the main functions.

In FIG. 5A the foreground program starts with "start" 60, the initializing conditions. Thence the function goes to decision point 61, "time to transmit?". This pertains to transmitting a "burst" of picture frames according to this invention. The answer is "yes" at times, but more often "no". If "no," thence to second decision point 62, "any requests?". If there are no requests the function returns to the beginning, as shown by the arrows on the "no" line. Traverse of this loop is usual, and this occurs several times a second.

When the "requests?" answer is "yes," the requested video material is located from among the VTR playbacks 1, 2, - - n, and that material is played back. This is the function of "the locate and playback the requested video material" 63.

Thereafter, this video is routed to Record VTR 8 and a relevant vertical interval (VI) code is inserted. This is function 64.

Following this, the frame(s) requested is recorded on video tape in VTR 8 immediately following preceeding frames. This is function 65.

Thereafter, the request list is decremented; i.e., the request that has just been handled is removed from the list. This is function 66. Then the function returns to the beginning to enquire "time to transmit?", and the process repeats.

Less frequently than the request routine, it will be "time to transmit". This "yes" actuates function 67, which is to "rewind tape recorder (VTR 8) to the start of the current burst sequence". The function activity then moves to 68, "playback burst video recording for transmission, route signal to the transmitter." The transmitter is prepared to accept and transmit the burst.

Thereafter the function progresses to 69, "position tape for next burst and record header video information".

Each burst may be separated from another by a blank frame, although these may be contiguous.

A burst-filled tape may be preserved for a time for historical reference, or the tape may be re-used by the known erasing process.

Concurrently with the above described foreground program, the background program of FIG. 5B is also running.

It has a beginning point, "start" 70, when the power is turned "on". The function then moves down to "control and status panel" 71, which is entity 24 in FIG. 2. This panel is scanned for the status of the controls entered by the user.

Thereafter, the function moves down to decision point 72, "is there a ring?" The "ring" is discerned through a telephone ringing detection circuit.

Most of the time there will not be a ring, so the function proceeds via the "no" loop, back to another scan of control panel 71.

When the answer to the "is there a ring?" query is "yes," an "auto answer circuit" goes "off-hook". That is, a load termination is put on the telephone line, causing the ringing of the telephone circuit to cease. This is function 73.

A voice then identifies that the "burst" service facility has been reached, and the user is urged to enter his requests; function 74. This is done by the user operating his touchtone telephone for the numerical code of his selection(s), despite the fact that he has already reached the telephone number originally called. A computer program will verify that his request(s) are valid. This is at decision point 75, "request valid?".

If not, should there be too many digits in the request, or a beginning digit is incorrect by being a digit for which there is no catalog number, an appropriate voice message formulated by the Central Controller and executed by voice synthesis entity 22 of FIG. 2, will ask for a correction of the request. This is via the "no" function from point 75 to "request correction" 76. The function proceeds back to the input of "request entry" 74, in order to receive the corrected entry.

If the request(s) is valid it will be accepted and a voice message will ask the user if there are further requests for frames. This is the "yes" function from decision point 75 to decision point 77, "additional requests?". If the answer is "yes" at point 77, then the function proceeds back to the input of "request entry" 74.

If there are no further requests from that user the function proceeds via "no" from point 77 to "enter que, compute and assign time and pages" 78. This is performed by the Central Controller, which also enters the frame(s) requested at record VTR 8 in FIG. 2.

A voice message is then given on the telephone line to the user, as to the time and page(s), and a voice sign-off, after which the telephone line at the "burst" facility is returned to "on-hook". This allows the telephone line to be ready for the next call. This is all accomplished at function 79, after which the function returns to "scan panel" at 71. The activity potential for the microprocessor returns to the "start" state.

Figure 6:
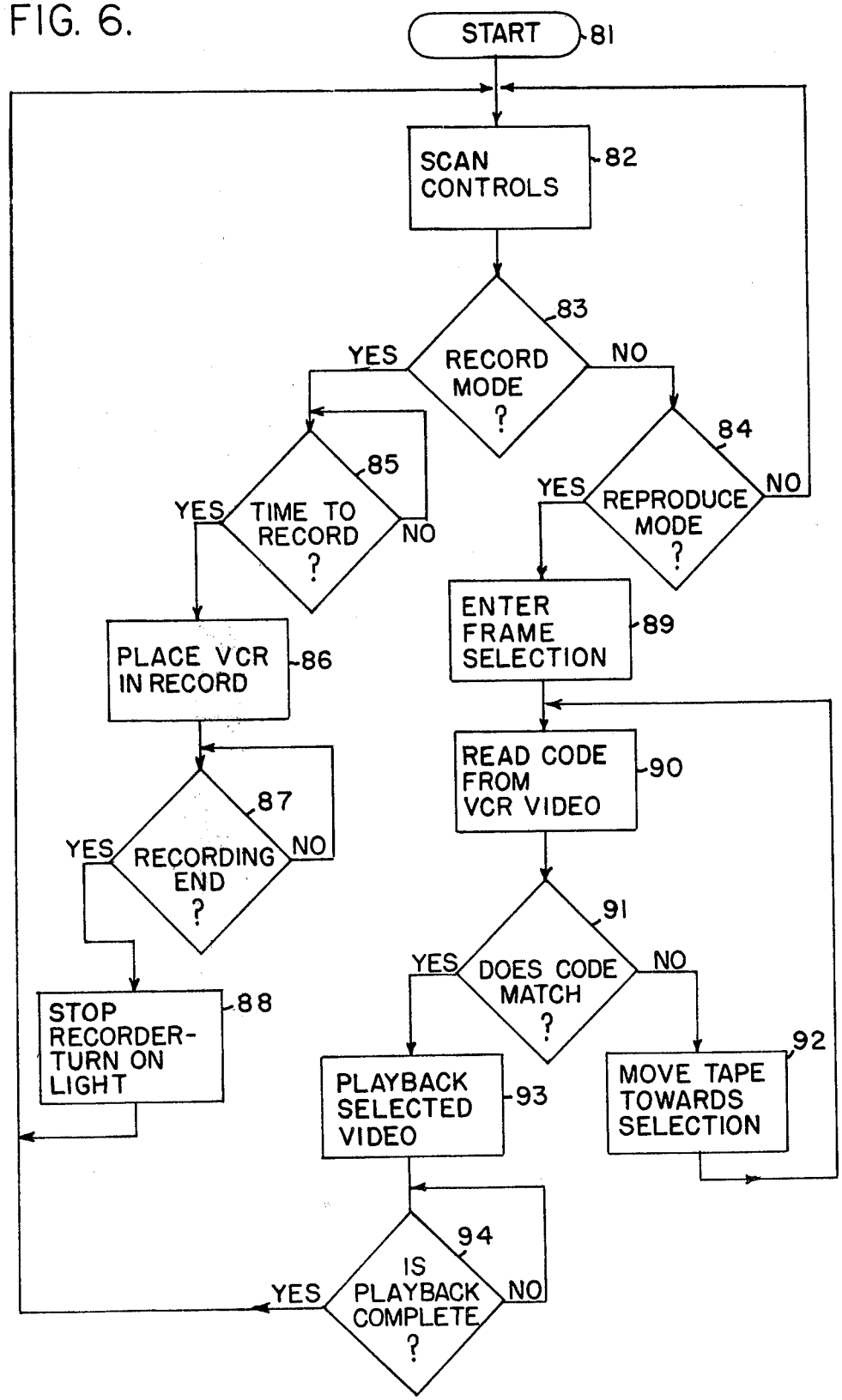
FIG. 6 is a flow chart for the microprocessor of the Local Controller.

FIG. 6 is a flow chart for microprocessor 47 of Local Controller 43. This is a single program flow chart.

The program starts with "start" 81, the initializing conditions. Thence, "scan the mode select controls" at 82. This function examines the positions of the switches that are a part of control/status panel 52, which determines what the user desires to do.

With this initial guidance the function progresses to first decision point 83, which asks "is the control in the record mode?" If the answer is "no," which is usual, progress is to the next decision point 84, which asks "is the control (82) in the reproduce mode?". If this answer is "no", the apparatus is in the idle mode and the function returns to "start" again, scans control 82 again, and so on.

When the user will have put control 82 in the record mode, for example, the answer at 83 will be "yes". Then the function passes on to decision point 85, "is it time to record?". Generally, the answer will be "no" and so the function merely goes around and around point 85 until it is time to record.

When this answer is "yes," activity 86, "place the video cassette recorder in record mode," is actuated and the recording of an incoming "burst" is accomplished.

Decision point 87, "is it time for the recording to end?" is also actuated. This query continues around the "no" loop of decision point 87 while the recording is continuing. When the recording is ended the answer here is "yes". This actuates "stop recorder and turn on recording complete light," 88. The recording complete light is shown in entity 52 of FIG. 4.

This recording operation having been completed, the function returns to the "start" 81 junction to await the next command.

If the user, on the other hand, had placed control 82 in the "reproduce" mode, the answer at point 84 is "yes". The activity of the function awaits for the user to "enter the desired frame selection" at 89. This is a page number or frame number of his choice expressed in terms uniform to the whole system. The function then reads the selection at "read code from video cassette recorder video" 90. This is the vertical interval time code; illustratively, the SMPTE code.

Then, at decision point 91 the question is posed, "does the V.C. Recorder code match that of the selection?" Generally the answer is "no," so the function enters entity 92, "move the V.C.R. tape towards selection."

From there the function returns to entity 90 to see if the required code match has been accomplished. If not, the activity repeats through entity 92 until a code match is obtained. The answer from decision point 91 is then "yes," and so "playback the selected video" 93 is activated. This energizes video cassette recorder 41 of FIG. 3, to accomplish the playback and the display upon TV display 44.

While entity 93 is activated the question is repeatedly asked at connected decision point 94, "is the playback complete?". While the user is viewing the playback of the selected frame the answer is "no", and so the function continues around the "no" loop. When the user no longer wishes to have the frame displayed he actuates a control on entity 82 to register his desire. The answer is then "yes" at point 94. This returns the function to "start" 81, and the user's apparatus stands ready to accept a further command when it is entered at entity 82.

Data that allows the "is it time to record" decision point 85 to make that decision comes from RAM memory 50 that is associated with microprocessor 47. Therein, the time to record has been previously entered in hours, minutes and seconds in the 24 hour format. Time of day clock 46 gives just that, having been once set to the correct time of day by the user.

When these two times match it is obviously "time to record". the match can be recognized by repeatedly performing arithmetic subtraction between the two times. When the answer to that operation is wholly zero, then the times do match.

The time is entered into the memory by the user, having received this information from the "burst" communications center by voice announcement. This occurs following the processing of his request by the computer, as has been previously stated herein.

The alternate mode of entering this time is to arrange the apparatus, Central Controller 1, to transmit the code over the telephone line to the user from telephone interface 20 directly to RAM memory 50 of microprocessor 47 of FIG. 4, through the intermediary of a second telephone interface in FIG. 4.

The duration of recording can be established by the conditions prevailing in the use of the system. One minute of recording provides 1,800 frames. The duration can be set from that fact, with a nominal excess to take care of minor mis-timing of the two clocks involved.

A selection of suitable wide-band transmission channels has been previously stated herein. The major example given has presupposed the joint use of the transmission channel; as with a television program service in which typically less than one minute of channel use would infrequently occur for the "burst" transmissions.

An alternate arrangement involves the use of a "dedicated channel" on a cable television or equivalent system. This is a separate wide band channel that is used exclusively, or nearly exclusively, for the "burst" service.

Because of the different subject matter in each of the successive "burst" still-picture frames the transmission appears as a series of kaleidoscopic flashes that are unintelligible to any viewer.

This is the opposite to usual television transmissions, in which each frame is invariably nearly the same as the one before and the one after. A motion picture presentation thus results.

With a dedicated channel, although a great amount of use might be made of it and it could be in reasonably continuous use, the transmission, if viewed, is not a television presentation in any sense of the word, but is a series of unintelligible flashes.

A significant difference between the two presentations is the very low concentration of visual information in the television presentation, where thousands of frames may have the same, or nearly the same, subject matter; as compared to the "burst" presentation, where typically every frame is different.

Thus, the efficiency in transmitting meaningful visual subject matter is thousands of times greater with the "burst" system. With the "burst" system a whole magazine can be transmitted in a fraction of a minute. Further, twenty years of a monthly magazine can be transmitted in an hour. Magazines and other periodicals can be "delivered" to subscribers by the "burst" process, with significant savings in paper and transportation costs.

As to apparatus, it will be recognized that large scale digital storage may be used instead of VTR recorder 41, and others, such as 8, 3, 4, etc. by employing semiconductor or other video storage devices.

The term "empirically scheduled basis" signifies that although certain operational constraints may cause a "burst" to be transmitted each half hour, this is not a requirement. The time interval may be shorter or longer, when possible or desired.

With the dedicated channel the time interval between a user's request and his "burst" may be only a very few minutes. This would vary with the amount of traffic in the system at the time.

The "means to form a video signal of one frame" may include a slide projector with television camera, a stop-frame motion picture projector with a television camera, a television camera viewing a scene in real time, or viewing a page of a magazine, a drawing, a photograph, or other.

"Burst" as used herein conotes a plurality of frames of television image format, typically comprised of two interlaced fields, as the United States standard of 525 lines, 30 frames, 60 fields per second. As previously stated the visual subject matter of each frame does not normally bear a relation to that of the preceding and the subsequent frames, such as does occur in normal television.

The term "video speed" means forming a video (television) image signal at a scanning speed such as to support continuity of motion of the suject matter as discerned by the human eye. Although speeds lower or higher can be employed, a recognized speed is the United States standard of 30 fields, 60 frames per second, two to one interlaced.

The term "user" has been used herein to identify a viewer at television display according to this system. The term "subscriber" might also be used if the user pays for the service. Technically, the three words are interchangeable.

I claim:

1. The method of distributing for storage and subsequent elective viewing plural dissimilar individually specified complete color images simultaneously to an unlimited number of remote receivers, which includes the method steps of:
   (a) forming plural frames of video signal, each of dissimilar specified subject matter,
   (b) contiguously storing in a manner allowing reproduction of each successive frame at video speed said frames prior to transmission,
   (c) transmitting only once all said contiguously stored frames of video signal in a continuous burst over a wide band communication channel at video speed,
   (d) contiguously storing at video speed all said frames of video signal at all remote receivers simultaneously during transmission, and
   (e) at any later time upon demand, locating and repeatedly reproducing at the original video speed a selected said frame of specified subject matter from the contiguous storage, after transmission, for viewing.

2. The method of claim 1, which includes the additional steps of;
   (a) entering into the non-visible portion of the video signal prior to transmission an address code sequentially numbering each of the plural dissimilar frames chosen,
   (b) storing each code with its video frame at a receiver, and
   (c) subsequently reproducing the stored address codes and automatically controlling the storage device to match the code to locate and display the specified frame.

3. The method of claim 1, in which;
   (a) the burst of frames of video signal is inserted into the wide band communication channel upon an empirically scheduled basis based upon user demand and transmission convenience.

4. The method of claim 1, which includes the additional steps of;
   (a) inserting on a mutually exclusive basis plural contiguous frames of video signal of the specified subject matter into an otherwise continuous video picture transmission, and
   (b) concommitantly inserting a sequential address code unique to each such frame in the vertical interval thereof.

5. Television apparatus for distributing plural dissimilar individually specified complete color images simultaneously to an unlimited number of remote receiving means for storage and subsequent elective viewing, comprising;
   (a) means to form (1-7) a video signal of each frame representing said complete specified images,
   (b) means to contiguously store (8) said video signals of said plural frames prior to transmission as a burst, (c) television transmitting means (9) having a bandwidth sufficient to transmit once said burst of video signals of said specified images at video speed,
(d) television receiving means (40) for accepting video signals from said transmitting means,
(e) means to contiguously store (41) at video speed all said video signals representing said plural specified images at each of said plural receiving means (40), said means to store connected to said television receiving means,
(f) means to reproduce television images (44), and
(g) local controller means (43) connected to said means to contiguously store and to said means to reproduce, to electively select and locate in said means to contiguously store any one of said specified images for continuous reproduction.

6. The television apparatus of claim 5, in which said means to form a video signal of each frame includes a central controller means having;
(a) plural sources of specified images (3,4,-n),
(b) sequential assembler means (3) connected to said central controller means to form a contiguous video signal representing said specified images, and
(c) I/O control means (32,33) to sequentially contiguously output said specified contiguous video signals in a burst from said sequential assembler means.

7. The television apparatus of claim 6, in which said central controller means (1) further includes;
(a) a microprocessor (14) having memory means (16,19),
(b) recorded computer program means (18),
(c) means to communicate with the user (20,21,22),
(d) means to control (26,27,28) plural video storage means to locate and reproduce specified video frames in accordance with the communication with said user,
(e) means to switch said plural video storage means to insert (30,31) a vertical interval sequential frame address code for each frame into the assembled video signal, and
(f) a bus (15) interconnecting the recited entities of the central controller means, for control by said microprocessor.

8. The television apparatus of claim 5, in which said local controller means (43) further includes;
(a) a microprocessor (47), having memory means (49,50),
(b) I/O control means (51) connected to said means to store (41),
(c) vertical interval code reading means (54) connected to said means to contiguously store (41) to retrieve the transmitted and stored vertical interval code for control thereof,
(d) a bus (48) interconnecting the recited entities of the local controller means for control by said microprocessor, and
(e) panel control means (52) and panel I/O means serially connected to bus (48) for supplying the vertical interval address codes of the frames selected by the user.

* * * * *